United States Patent [19]

Nagamine et al.

[11] Patent Number: 4,722,043
[45] Date of Patent: Jan. 26, 1988

[54] CONTROL SYSTEM WITH CHANGABLE TIME-SHARED EXECUTION OF LADDER AND NON-LADDER PROGRAMS

[75] Inventors: Tsuyoshi Nagamine; Fumio Kawamura, both of Hachioji; Shuji Toriyama, Setagaya, all of Japan

[73] Assignee: Fanuc Ltd., Minamitsuru, Japan

[21] Appl. No.: 849,459

[22] PCT Filed: Jul. 22, 1985

[86] PCT No.: PCT/JP85/00415
§ 371 Date: Mar. 26, 1986
§ 102(e) Date: Mar. 26, 1986

[87] PCT Pub. No.: WO86/01012
PCT Pub. Date: Feb. 13, 1986

[30] Foreign Application Priority Data

Jul. 27, 1984 [JP] Japan .................. 59-157007

[51] Int. Cl.⁴ .............................................. G05B 19/02
[52] U.S. Cl. ...................................... 364/147; 364/200
[58] Field of Search ........ 364/146, 147, 200 MS File, 364/900 MS File

[56] References Cited

U.S. PATENT DOCUMENTS

| | | | |
|---|---|---|---|
| 4,060,848 | 11/1977 | Hyatt | 364/200 |
| 4,109,311 | 8/1978 | Blum et al. | 364/200 |
| 4,197,579 | 4/1980 | Otis, Jr. et al. | 364/200 |
| 4,320,453 | 3/1982 | Roberts et al. | 364/200 |
| 4,396,974 | 8/1983 | Imazeki et al. | 364/147 |
| 4,400,769 | 8/1983 | Kaneda et al. | 364/200 |
| 4,430,707 | 2/1984 | Kim | 364/200 |
| 4,477,871 | 10/1984 | Keshlear | 364/200 |
| 4,495,562 | 1/1985 | Yamaji et al. | 364/200 |

*Primary Examiner*—Jerry Smith
*Assistant Examiner*—Allen MacDonald
*Attorney, Agent, or Firm*—Staas & Halsey

[57] ABSTRACT

The present invention allows a programmable controller in a stored program system to easily execute even complex sequence control. A memory (50) has stored therein a first program of the ladder type and a second program described in another program language such as PASCAL or FORTRAN. First and second setting devices (51) and (52) set the execution times for processing by the first and second programs, respectively. A management device (53) executes the processing according to the first and second programs alternately for the periods of time set by the first and second setting device (51) and (52).

2 Claims, 7 Drawing Figures

FIG. 3
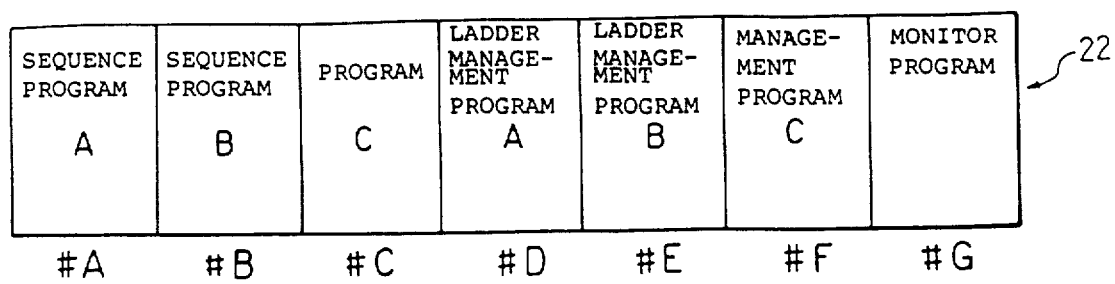
FIG. 5
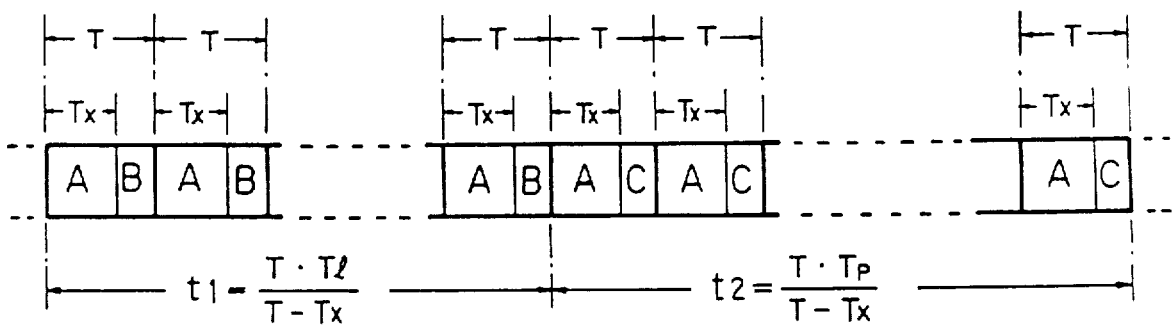
FIG. 6
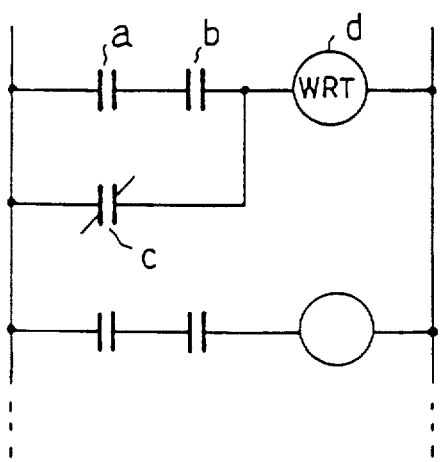
FIG. 7
|   | INSTRUCTION CODE | ADDRESS |
|---|---|---|
| a | RD | 10.0 |
| b | AND | 200.1 |
| c | OR NOR | 200.2 |
| d | WRT | 210.1 |

CONTROL SYSTEM WITH CHANGABLE TIME-SHARED EXECUTION OF LADDER AND NON-LADDER PROGRAMS

BACKGROUND OF THE INVENTION

1. Field of the Invention

The present invention relates to a control system for a programmable controller which processes, via a program, sequence control of a numerically-controlled machine tool through utilization of a stored program system.

2. Description of the Related Art

Conventionally, a power circuit including a number of relays is interposed between a numerical control unit and a machine tool, and a predetermined one of the relays is activated by a command from the numerical control unit, thereby causing the machine element to perform an operation corresponding to the command. However, the provision of such a power circuit leads to defects in that the numerical control unit inevitably becomes bulky and costly because of the use of many relays. To avoid such defects, a programmable controller has come into wide use which implements the function of the power circuit through program processing.

In general, according to such a program controller, a sequence program of the ladder type is stored in a memory and a processor executes the sequence program, thereby performing sequence control of the machine. The ladder type sequence program is a program in which functions of the power circuit are logically programmed in terms of instruction codes. For example, the ladder type sequence program corresponding to the ladder diagram illustrated in FIG. 6, which shows a part of the power circuit indicated by relay contacts and relay coils, is such as shown in FIG. 7. Here, reference characters RD, OR, NOT, etc. respectively identify instruction codes, RD being a read-out instruction, AND an AND operation instruction, WRT a write instruction, OR an OR operation instruction, and OR NOT an instruction for an OR operation with a "not" value. Further, 10.0, 200.1, etc. are addresses (predetermined addresses, predetermined bits) in a data memory at which the instruction codes are executed. Via the execution of the instructions of the sequence program, a logical operation, (a.b)+c, is performed and the result of the operation ("1" or "0") is stored in a first bit of an address 210 of the data memory.

In terms an operation of the power circuit, a relay coil d is energized in accordance with the state of relay contacts a, b, and c.

The programmable controller generally performs logical operations under control of such a ladder type sequence program as mentioned above to effect sequence control of the machine, but sometimes it is necessary to conduct processes which are difficult to describe in the ladder type program language, such as four operations, an operation of a trigonometric function and time management. In anticipation of this, the conventional programmable controller is equipped with a memory which has stored therein a routine for four operations, a routine for time management, or the like described in a computer language such as PASCAL or FORTRAN, and is adapted to be capable of freely using the stored routine just like a subroutine of the ladder type program.

However, since the computer language which the prior art programmable controller is permitted to use for sequence control of the machine is limited only to the language stored in the memory, it is difficult to exercise complex sequence control of the machine in accordance with the internal state of the numerical control unit (for example, a process which performs an operation corresponding to the current position of the machine and branches the sequence according to the results of the operation). Moreover, since the contents of the memory cannot be modified by the user, there are cases where it is difficult to prepare the sequence program.

SUMMARY OF THE INVENTION

The present invention is intended to obviate the abovedescribed defects in the prior art, and has for an object permitting sequence control of a machine tool through free use of both the ladder type program and a program written in a computer language such as PASCAL or FORTRAN.

FIG. 1 is a block diagram illustrating the arrangement of the present invention. A memory 50 has stored therein a first program of the ladder type and a second program described in the program language. A first setting means 51 sets the execution time for processing by the first program, and a second setting means 52 sets the execution time for processing by the second program. A management means 53 performs, on a time-shared basis, the processing according to the first and second programs alternately for the periods of time set by the first and second setting means 51 and 52.

BRIEF DESCRIPTION OF THE DRAWINGS

FIG. 3 is a memory map showing the stored contents of a ROM;

FIG. 5 is a diagram showing the state of execution of processing by programs A to C;

FIG. 6 is a ladder diagram; and

FIG. 7 is a diagram showing a sequence program corresponding to the ladder diagram depicted in FIG. 6.

DESCRIPTION OF THE PREFERRED EMBODIMENT

Figure 1:
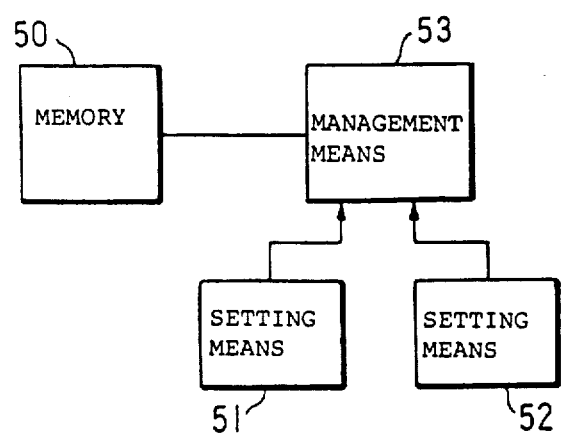
FIG. 1 is a diagram illustrating the arrangement of the present invention.
Figure 2:
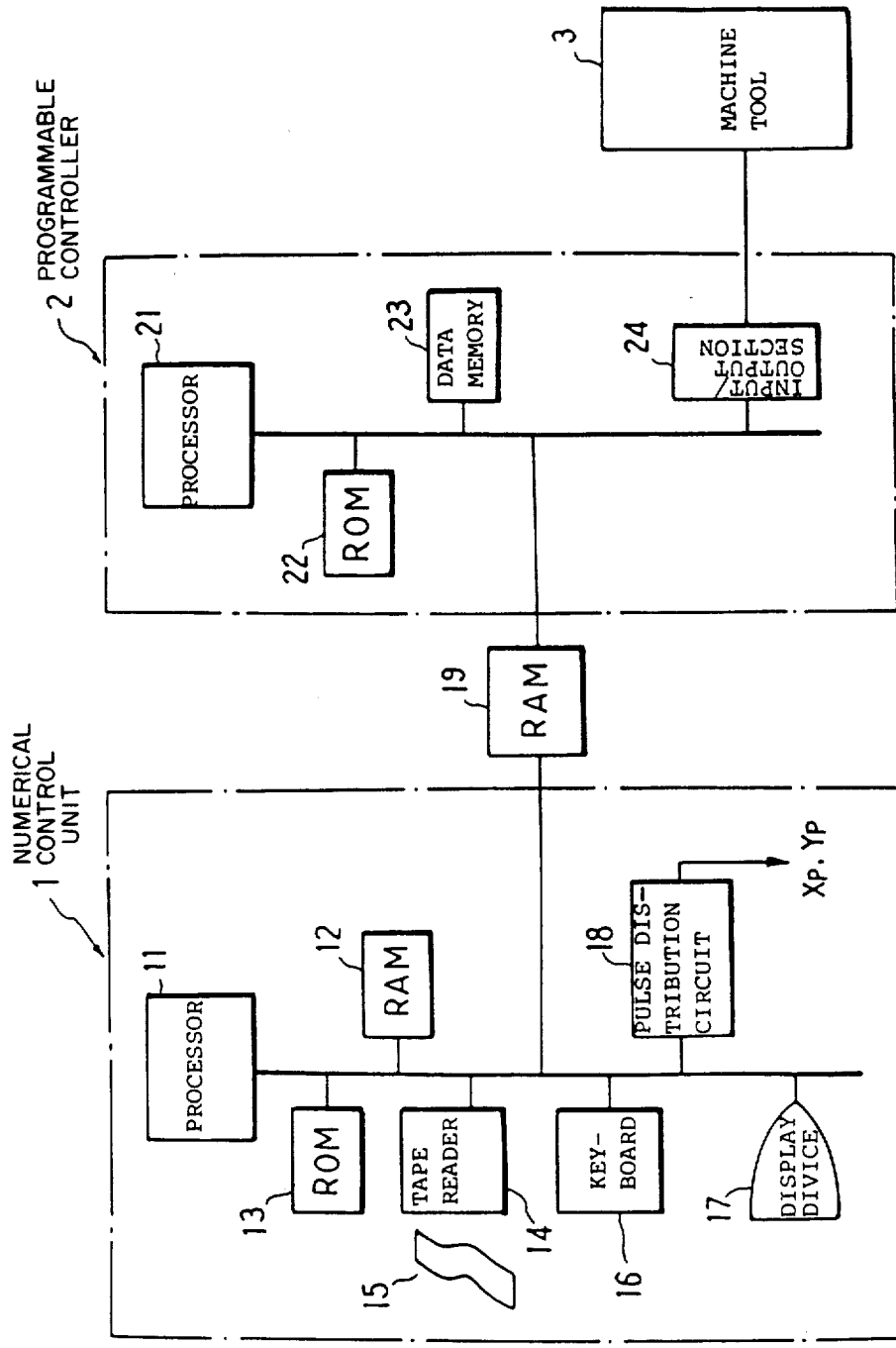
FIG. 2 is a block diagram illustrating an embodiment of the present invention.

FIG. 2 illustrates in block form an embodiment of the present invention. Reference numeral 1 indicates a numerical control unit, 2 a programmable controller, 3 a machine tool, 11 a processor and 12 a RAM for storing a cutting command which is read out of a command tape 15 by means of a tape reader 14, Reference Numeral 13 indicates a ROM having stored therein a control program for controlling the numerical control unit 1, 16 a keyboard, 17 a display device, 18 a pulse distribution circuit for providing distribution pulses Xp and Yp to servo circuits and 19 a RAM which is shared by the numerical control unit 1 and the programmable controller 2. Reference Numeral 23 indicates a data memory for storing, in the form of a "1" or "0", data indicating the ON or OFF state of each relay of a power circuit depicted in FIG. 5 and 24 an input/output section.

The ROM 22 of the programmable controller 2 has, as shown in FIG. 3, an area #A which has stored therein a sequence program described in the ladder type program language (hereinafter referred to as the sequence program A), an area #B which has stored therein a sequence program described in the ladder type program language (hereinafter referred to as the sequence program B), and an area #C which has stored therein a program described in a computer language such as PASCAL (hereinafter referred to as the program C). Also included are an area #D which has stored therein a ladder management program A for controlling the sequence program A, an area #E which has stored therein a ladder management program B for controlling the sequence program B, an area #F which has stored therein a management program C for controlling the program C, and an area #G which has stored therein a monitor program for controlling the ladder management programs A and B and the management program C. The sequence program A is a program in which a task calling for a high-speed process (a process for detecting that the position of a movable machine part has reached a stroke limit, for example) is described in the ladder type program language, and the sequence program B is a program in which a task, which does not need high-speed processing (fault diagnosis, for instance), is similarly described in the ladder type program language.

Figure 4:
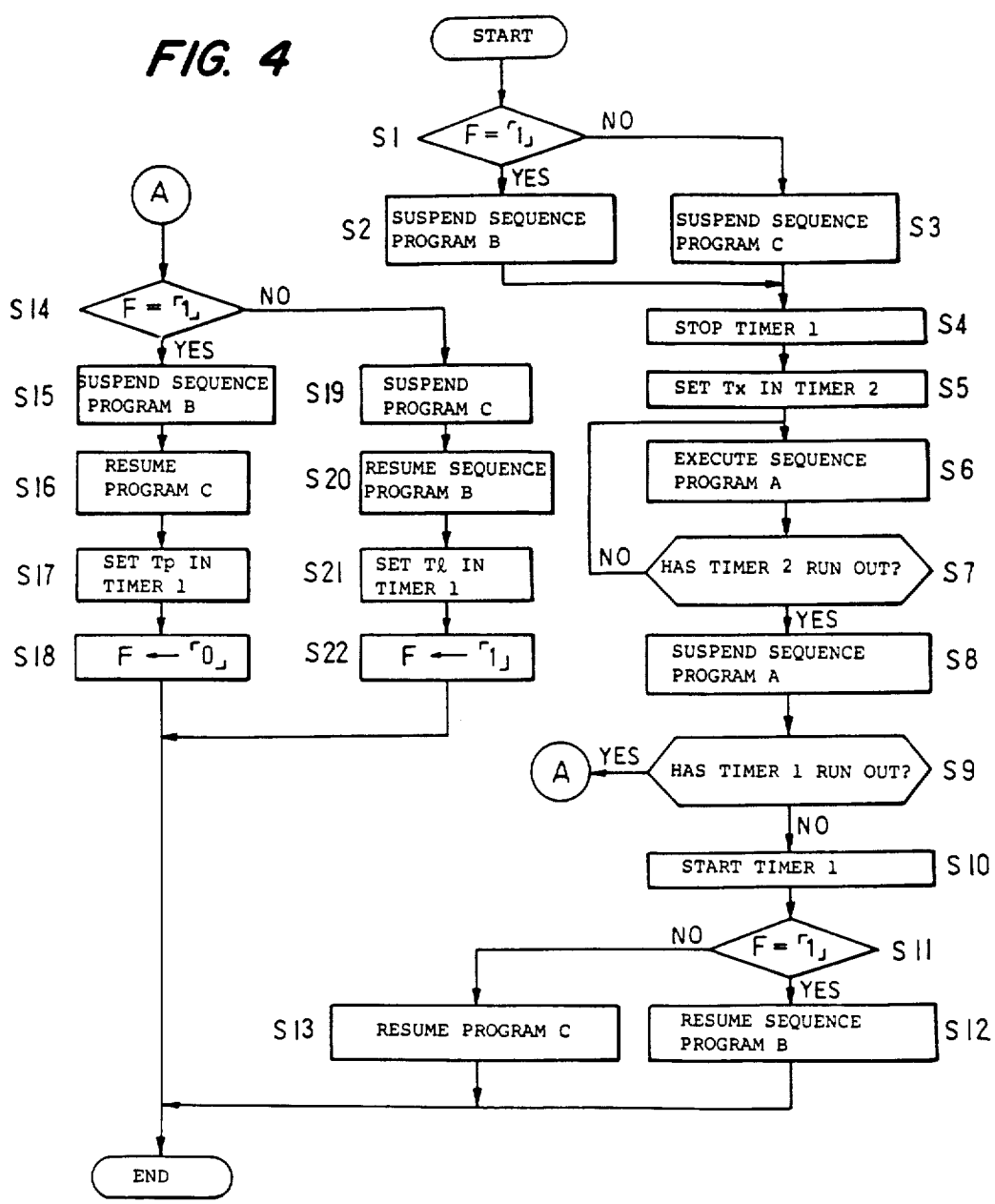
FIG. 4 is a flowchart showing an example of the contents of processing by a program 21.

FIG. 4 is a flowchart showing the contents of processing by the processor 21 (processing under control of the monitor program) in the programmable controller 2. A description will be given, with reference to FIG. 4, of the operation of the embodiment depicted in FIG. 2.

The processing by the monitor program shown in the flowchart of FIG. 4 is performed at fixed interval of time T (8 msec, for example). In step S1 a check is made to determined whether a flag F is a "1" or "0", that is, whether processing by the sequence program B or processing by the program B is currently executing. When it is determined in step S1 that the flag F is a "1", the ladder management program B is placed in the WAIT state, suspending the processing of the sequence program B (step S2). When it is determined that the flag F is a "0", the management program C is placed in the WAIT state, suspending the processing of the program C (step S3). The flag F is held at a "0" in the initial state (when power is connected).

Upon completion of the processes of steps S2 and S3, the processor 21 stops a timer 1 provided therein on a software basis (step S4), sets in a timer 2 the execution time Tx (where Tx<T) for the processing of the sequence program A (step S5), and starts the ladder management program A, initiating the processing of the sequence program A (step S6). Thereafter, when it is determined that the timer 2 has run out, i.e. that the processing of the sequence program A has been conducted for the time Tx (step S7), the ladder management program A is put in the WAIT state, suspending the processing of the sequence program A (step S8). Next, the processor 21 determined whether the timer 1 has run out (step S9) and, if not, reactivates the timer 1 stopped in step S4 (step S10), after which the processor decides whether the flag F is a "1" (step S11). If the result of the decision in step S11 is YES, then the ladder management program B is released from the WAIT state to resume the processing of the sequence program B (step S12). If the result of the decision is NO, then the management program C is released from the WAIT state to resume the processing of the program C (step S13), after which processing based on the monitor program is terminated.

When the result of the decision in step S9 is YES, a check is made to see whether the flag F is a "1" or not (step S14), and if so, then the ladder management program B is put in the WAIT state, suspending the processing of the sequence program B (step S15). Then the management program C is released from the WAIT state to resume the processing of the program C (step S16), the execution time Tp for the processing of the program C is set in the timer 1 (step S17), and the flag F is set to a "0" (step S18), after which processing based on the monitor program is terminated.

When the result of the decision in step S14 is NO, the management program C is placed in the WAIT state to suspend processing of the program C (step S19), the ladder management program B is released from the WAIT state to resume the processing of the sequence program (step S20), the execution time Tl for the processing of the sequence program B is set in the timer 1 (step S21), and the flag F is set to a "1" (step S22), after which processing based on the monitor program is terminated.

The execution time Tl for the processing by the sequence program B and the execution time Tp for the processing by the program C are determined as shown by the following equations (1) and (2):

$$Tl = t \times (1 - P) \quad (1)$$

$$Tp = t \times P \quad (2)$$

where t is a time (200 msec, for example) which is set by a programmer and P is a constant which satisfies the condition, $0 \leq P \leq 1$, set by the programmer.

Accordingly, in this embodiment, the processing by the sequence programs A and B and the program C is performed in such a manner as depicted in FIG. 5. In FIG. 5, reference characters A, B and C identify the processes of the programs A, B and C, respectively. As will be seen from FIG. 5, according to this embodiment, the time Tx of the predetermined time T is alloted to the processing of the sequence program A and the remaining period of time (T−Tx) is alloted to the processing of the sequence program B or the program C. The alternate execution of processing by the sequence program A and processing by the sequence program B lasts for a period Tl/(T−Tx) (T being one period), that is, for a time $t1 = T \cdot Tl/(T-Tx)$, and the alternate execution of processing by the sequence program A and processing by the program C lasts for a period Tp/(T−Tx), that is, for a time $t2 = T \cdot Tp/(T-Tx)$. The ratio between the times t1 and t2 can freely be set by changing the value of the constant P, as will be understood from Eqs. (1) and (2). Therefore, according to this embodiment, the execution time for the processing by the ladder type program (the sequence programs A and B) and the execution time for the processing by the program described in the computer language such as PASCAL (the program C) can freely be adjusted in accordance with the contents of processing by the programmable controller 2. Accordingly, complex sequence control can also be effected efficiently.

As described above, according to the present invention, a ladder type program suitable for sequence control and a program described in a computer language such as PASCAL, suitable for four operations, time management, decision processing, etc. are prestored in a memory, first and second programs are alternately executed, on a time-shared basis, for periods of time set by first and second setting means, and the execution times for the first and second programs can freely be set, complex sequence control can also be achieved efficiently. Furthermore, since different types of programs can freely be used, programs for complex sequence control can easily be produced.

We claim:

1. A control system for a programmable controller of a stored program system that prestores a program in a memory and effects sequence control for a numerically-controlled machine tool in accordance with the program stored in the memory, comprising:

the memory storing a first program of the ladder type and a second program described in a program language;

first setting means for setting the execution time for processing by the first program;

second setting means for setting the execution time for processing by the second program; and management means for controlling the first and second programs, wherein the management means causes execution of, on a time-shared basis, the processing by the first and second programs alternatively for period of time set by the first and second setting means.

2. A control system for a numerical controller, comprising:

a numerical control unit including:

storage means for storing a ladder type program and a non-ladder type program; and execution control means for time share controlling the execution of the ladder and non-ladder type programs in dependence on a changeable time share ratio that determines execution time allotted to the ladder and non-ladder type programs.

* * * * *